Feb. 2, 1960 A. GUDMUNDSEN 2,923,329
TOOTHED SAWING CHAIN
Filed May 19, 1955 2 Sheets-Sheet 1
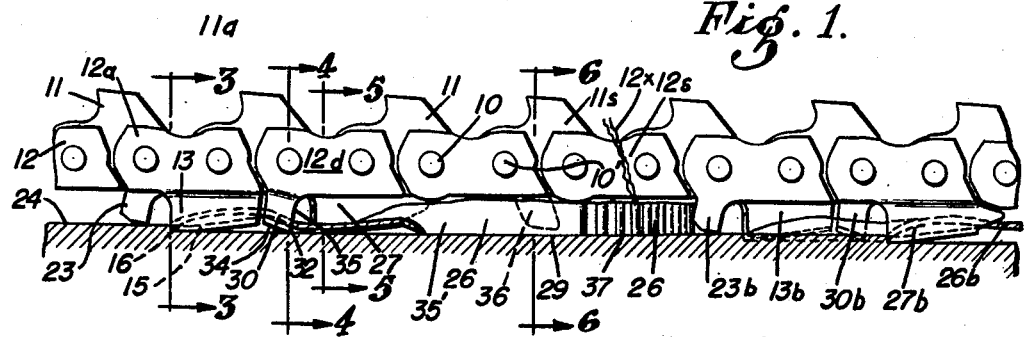
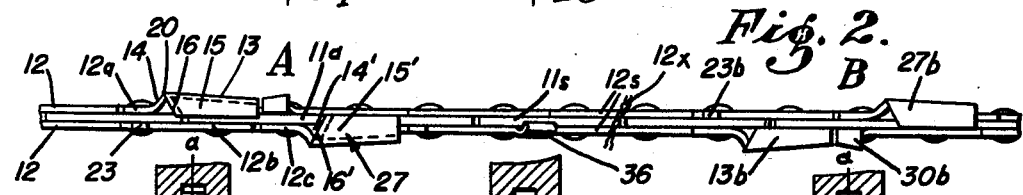
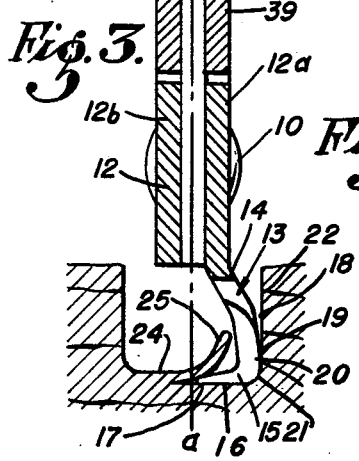
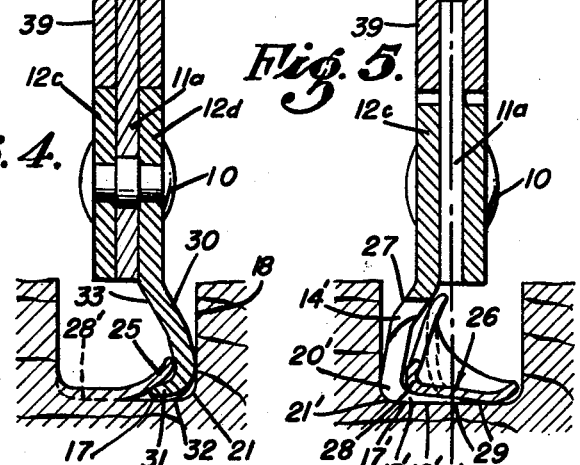
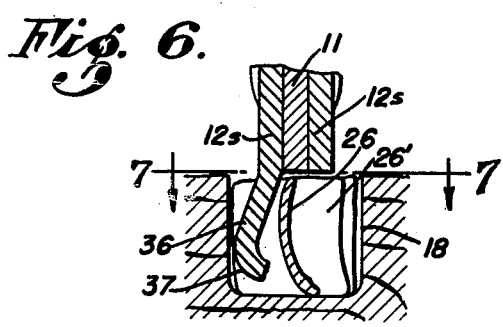
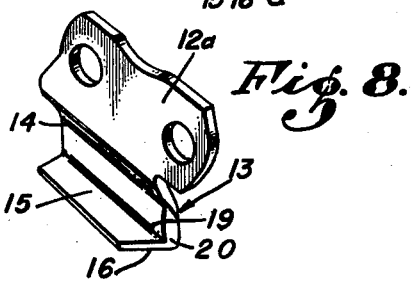
INVENTOR.
AUSTIN GUDMUNDSEN
BY
Attorney Feb. 2, 1960 A. GUDMUNDSEN 2,923,329
TOOTHED SAWING CHAIN
Filed May 19, 1955 2 Sheets-Sheet 2

INVENTOR.
AUSTIN GUDMUNDSEN
BY
Attorney

United States Patent Office 2,923,329
Patented Feb. 2, 1960

2,923,329

TOOTHED SAWING CHAIN

Austin Gudmundsen, Inglewood, Calif., assignor to McCulloch Corporation, Los Angeles, Calif., a corporation of Wisconsin Application May 19, 1955, Serial No. 509,570

14 Claims. (Cl. 143—135)

This invention relates to chain saw devices in general and relates in particular to improvements in saw chains having saw teeth or cutters mounted on the links of a chain.

It is an object of the invention to provide a saw chain which is not only durable in construction but is capable of cutting faster with the same input than a saw chain of equivalent size in use prior to my invention. For example, in a chain saw of a size commonly used for tree felling and bucking, the saw chain extensively employed in logging operations in the northwest woods is approximately forty percent slower in its cutting rate than the chain made in accordance with the present invention.

It is an object of the invention to provide a saw chain having cutters arranged to remove ribbons of wood from the bottom of the cut or kerf being formed by the cutting operation, with a minimum expenditure of power resulting from a new arrangement and form of cutters.

It is an object of the invention to provide a saw chain which will efficiently cut and bore, having cutting units, each consisting of a pair of articulated allochiral cutters adapted to first cut and lift one side of a ribbon of wood from the bottom of the kerf, and then sever the remaining side of the ribbon at precisely the same level as the first cut, thus cleanly releasing the ribbon-like chip from the wood so that it may be easily and efficiently removed from the kerf.

It is an object of the invention to provide a saw chain having a plurality of cutting units each consisting of a link carrying a leading cutter and closely following thereafter a link carrying a finishing cutter, in opposite hand relation, and a plurality of connecting links between each cutting unit and the succeeding cutting unit, spacing the cutting units apart so as to form therebetween sections or compartments to receive the ribbons which have been cut from the kerf bottoms by the cutting units, and to convey the ribbons out of the kerf in such a manner that the accumulation of the cuttings or ribbons in the kerf will not interfere with the cutting action of the saw chain.

A further object of the invention is to provide a saw chain wherein the following or finishing cutter of each cutting unit is preceded by a submerged depth gauge having an end portion which rides upon the newly formed bottom surface cut by the preceding leading cutter under the ribbon edge which has just been lifted thereby, thereby providing for a comparatively smooth cutting action during forward movement of the finishing cutter. The invention not only provides a chain having a very smooth cutting action, but also one which is of marked self-feeding character so that it is not necessary for the saw operator to bear down heavily upon the saw so as to force the cutters into the wood. A further feature of the invention consists in the balancing of the cutting action of the saw chain so that it does not tend to pull to one side but will cut straight ahead. This is accomplished by the provision of cutting units formed of allochiral cutters, the cutting units being likewise in allochiral relation. That is to say, the leading cutter of each cutting unit is of opposite hand to the leading cutter of the preceding cutting unit. The reduction in lateral vibration of the chain supporting blade of the present invention is an additional important feature contributing to greater cutting efficiency. Lateral blade and chain vibration in many chain saws now in use results in the cutting of a kerf which is wider at the rear end than at the front; whereas the smooth cutting action of the present chain results in the formation of a kerf which is substantially the same width from end-to-end thereof.

It is a further object of the invention to provide a saw chain adapted for efficient operation at high speed wherein the cutting units are spaced apart at a distance so that the length of each ribbon conveying compartment or section will be a multiple of the length of the cutter unit. This relationship is achieved by placing a plurality of connecting links between succeeding cutting units. This spacing of the cutting units contributes to the efficient cutting action of the new chain since it avoids piling up of cuttings or chips between the cutters of a chain to the extent resulting in a lifting of the chain from the bottom of the kerf so that one or more cutters are held out of cutting engagement with the kerf bottom. In the operation of the chain of the present invention each consecutive cutting unit is enabled to remove a ribbon from the full length of the bottom of the kerf, with such consistency that each cutting unit upon each pass through the kerf adds to the depth thereof.

A further object of the invention is to provide a saw chain having cutting units, each employing cooperating cutters to lift a ribbon-like chip from the kerf bottom, the cutting units being spaced apart by connecting links one or more of which has thereon a runner which moves through the kerf without performing any cutting action, but contributing to smoothness in the operation of the saw during straight-cutting and also in boring. In the form of the chain contemplated for use in the cutting of hard woods, the depth of cut of each cutting unit is reduced so that there is a corresponding reduction in the volume of the chip removed thereby. Likewise, the spacing between cutting units is decreased so that the use of an intermediate runner is not used.

A further object of the invention is to provide a runner of novel form and placement. This novel runner is arranged in following relation to the shank of the preceding finishing cutter and is similarly offset from the longitudinal central plane of the chain in such position that it will pass forwardly along one side of the ribbon cut by the preceding cutting unit, while at the same time assisting in urging the ribbon forwardly in the kerf and thereby assisting in the discharge of the ribbon or chip from the kerf in an efficient manner. A further feature of this novel runner is that it is so positioned with relation to the link which supports it that it does not require filing as the cutters are sharpened and thereby reduced in height. These runners are likewise characterized by increased extension during boring operation of the chain.

A further object of the invention is to provide a saw chain wherein the useful life of the chain is extended by arranging the cutters and associated depth gauge so that cutters of increased length are provided on links of given size.

Further objects and advantages of the invention may be brought out in the following part of the specification wherein small details have been described for the competence of disclosure, without intending to limit the scope of the invention which is set forth in the appended claims.

Referring to the accompanying drawings which are for illustrative purposes only:

Fig. 1 is an elevational view showing a portion of a saw chain, according to the present invention, this view illustrating the manner in which a ribbon is cut from the kerf bottom;

Fig. 2 is a bottom plan view corresponding to Fig. 1;

Fig. 3 is an enlarged fragmentary sectional view taken as indicated by the line 3—3 of Fig. 1, showing the manner in which the leading cutter lifts one side of a ribbon from the bottom of the kerf;

Fig. 4 is a fragmentary sectional view taken as indicated by the line 4—4 of Fig. 1, showing the manner in which the depth gauge engages the new kerf bottom formed by the leading cutter;

Fig. 5 is a fragmentary section, to enlarged scale, showing the manner in which the following cutter severs and lifts the remaining side of the ribbon;

Fig. 6 is a fragmentary section view taken as indicated by the line 6—6 of Fig. 1;

Fig. 8 is a perspective view of one of the cutters;

Figure 9:
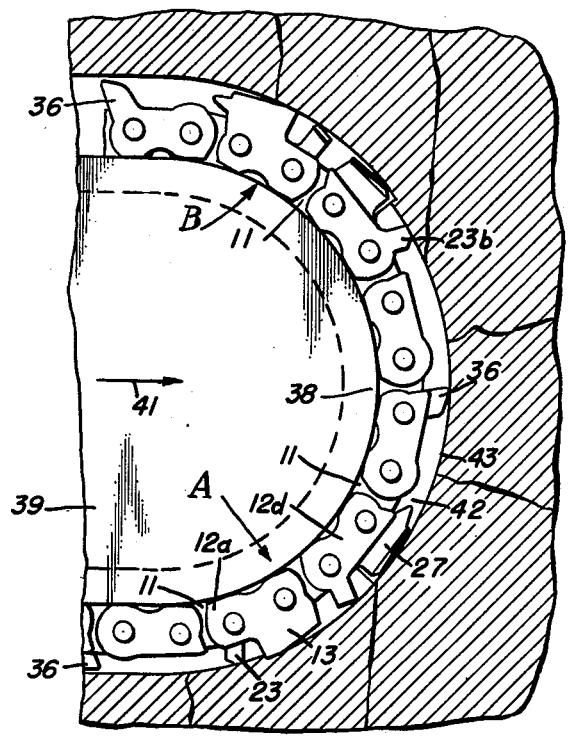
Fig. 9 is an enlarged, partly sectioned view showing the cutter teeth of the chain depicted in Fig. 1 in boring position as they travel around the end of a supporting blade.

As shown in Figs. 1 and 2, the saw chain comprises links which are connected consecutively by joints formed by pins 10 in a known manner. The links of the chain are classified both as to position and function, as will be hereafter brought out. Center links 11, arranged in end-to-end relation, are connected by pairs of side links 12. A leading cutter 13 is mounted on a side link 12a. The leading cutter 13, as shown in Figs. 1, 2 and 3, comprises a web or shank 14 which extends from the lower edge of the side link 12a downwardly and outwardly away from the central plane a—a of the chain, shown in Fig. 3, and a transverse kerf-bottom-cutting toe or blade portion 15 extending from the lower edge of the web 14 toward the central vertical plane a—a.

As shown in Figs. 1 and 8, the front edge 16 of the blade portion 15 is sloped backwardly so as to be positioned diagonally and is sharpened so that it is an efficient cutting edge for cutting one side 17 of a new bottom for the kerf 18. The blade portion 15 merges with the shank 14 through a relatively sharply curved portion 19 which is sharpened as shown at 20 to provide the cutter 13 with a corner cutting portion which will cut the corner 21, Fig. 3, existing between the bottom wall portion 17 and the side wall 22 of the kerf 18. The corner cutting portion of the cutter 13, being curved through an angle of more than ninety degrees likewise cuts or increases the depth of the side wall 22 progressively as the depth of the kerf is increased by the cutting action of the cutters.

As shown in Figs. 1, 2 and 3 there is a side link 12b opposite the side link 12a, having a downwardly projecting portion 23 forming a gauge for the leading cutter 13. The lower end face of the gauge 23 is offset upwardly from the horizontal plane of the cutting edge 16 so that as the leading cutter moves forwardly it will cut from the existing kerf bottom one side 25 of the ribbon 26 shown in Figs. 1 and 5. The completion of the cutting of the ribbon 26 from the bottom of the kerf 18 is accomplished by the closely following finishing cutter 27 which is approximately allochiral to the leading cutter 13 and under the control of a gauge 30, hereinafter to be described, accurately cuts from the existing bottom of the kerf the remaining side portion 28 of the ribbon 26, indicated by dotted line 28' in Fig. 4.

Being opposite hand from the leading cutter 13, the finishing cutter 27 is mounted on a side link 12c which is on the opposite side of the chain from the link 12a which carries the cutter 13. It is on the same side of the chain as the link 12b and is connected to the links 12a and 12b by the center link 11a. The finishing cutter 27 has a shank 14' which extends downwardly from the lower edge of the side link 12c and outwardly in the opposite direction from the shank 14 so that its corner and side cutting portion 20' will cut the corner 21' of the new kerf bottom 29, Fig. 5, resulting from the removal of the ribbon 26. The cutter 27 has a blade or bottom cutting portion 15' extending from the lower end of the shank 14' inwardly and across the central plane a—a, Fig. 5 of the chain, its diagonal cutting edge 16' being on the same horizontal plane as the cutting edge 16 of the leading cutter 13 so that the bottom surface 17' which it cuts will be a continuation of the bottom surface 17 cut by the cutting edge 16 of the leading cutter 13, thereby forming a ribbon 26 which is of constant thickness from side-to-side and leaving a flat new bottom surface 29 for the kerf 18. as shown in Fig. 5.

An important feature of the invention is the provision of the submerged gauge 30 for the finishing cutter 27, which gauge 30 has a portion or toe 31 which is disposed directly behind the leading cutter 13 and engages the part 17 of the new kerf bottom beneath the lifted edge 25 of the ribbon 26. The lower extremity or rear lower corner 32, Fig. 1, of the gauge 30 is disposed on the same horizontal plane as the cutting edges 16 and 16' of the leading and finishing cutters 13 and 27, so that it definitely aligns the bottom surface portion 17 and 17', assuring complete severance of the ribbon 26 from the bottom surface 29 of the kerf 18 without tearing of wood cross grain along the bottom of the kerf. The gauge 30 includes a shank 33 which extends downwardly and outwardly from the side link 12d following and in alignment with the shank 14 of the leading cutter 13. The toe portion 31 thereof extends under the ribbon edge 25 so as to engage the bottom part 17.

The cutters 13 and 27 are provided with rake and side clearance in keeping with the known practice of cutting tools. From Fig. 1 it will be noted that the bottom faces of the leading and finishing cutters 13 and 27 slope upwardly in rearward or rightward direction, and from Fig. 2 it will be noted that the external side faces of the cutters 13 and 27 converge rearwardly or rightwardly toward the central longitudinal plane of the chain. The foregoing is old in chain saw practice, but it will be observed that the lower face 34, Fig. 1, of the toe 31 of the gauge 30 slopes downwardly in rearward (rightward) direction so that the vertically longest portion of the gauge 30 corresponds to the corner 32. From this corner 32 the toe 31 slopes upwardly and forwardly to a point adjacent the rearward end of the blade 15 of the leading cutter 13. This arrangement is for the easy correlation of the gauge 30 with the cutters 13 and 27. The cutters 13 and 27 are sharpened by filing back the front ends thereof. Owing to the fact that the lower faces of these cutters 13 slope upwardly in rearward direction, there results a shortening of the vertical lengths of the cutters 13 and 27. So that the lowermost point, such as the corner 32, of the gauge 30 may be on the same horizontal plane as the cutting edges 16 and 16' of the cutters 13 and 27, it is arranged that the rear face 35 of the gauge 30 be filed. This will shift the corner 32 forwardly (leftwardly), and owing to the fact that the toe 31 slopes upwardly in forward direction, as described hereinbefore, the corner 32 of the gauge 30 will move upwardly and therefore may be maintained in the same horizontal plane as the cutting edges 16 and 16' merely by filing off the back face 35 of the gauge 30. The thickness of the ribbon or chip 26 is determined by the length of the gauge 23. For the pines of the northwestern States a gauge setting from forty to fifty thousandths of an inch is found quite satisfactory.

The closely related, but articulated, cutters 13 and 27, with their respective gauges 23 and 30, constitute a cutting unit A which is capable of removing a ribbon 26 of wood from the bottom of the kerf 18. The saw chain comprises a plurality of these cutting units connected in spaced relation along the length of the chain. For example, a cutting unit allochiral to the cutting unit A is shown at B in Fig. 2, connected to the cutting unit A by a plurality of connecting links consisting of links 11s and 12s having no cutters extending therefrom. Half of the cutting units, such as the counterparts of the unit A have their leading cutters arranged along one side of the chain and the remaining half of the cutting units, like the cutting unit B, have their leading cutter arranged along the opposite side of the chain. This results in a balanced cutting action so that the saw chain cuts straight into the wood instead of tending to drift sidewardly, avoiding a curved cut which might bind the saw blade on which the chain runs.

As shown in Fig. 1 there is, between the chain links 11s and 12s and the bottom 29 of the kerf 18, an elongated space or compartment 35', in which the ribbon 26 is accumulated and carried along the kerf to the exterior at the end thereof, without the ribbon 26 acting to lift the chain so as to interfere with the action of the cutting unit B in the removal of a consecutive ribbon 26b from the kerf bottom.

Figure 7:
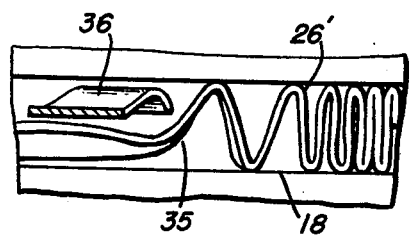
Fig. 7 is a fragmentary sectional view taken as indicated by the line 7—7 of Fig. 6.

As shown in Figs. 1, 6 and 7 a runner 36 is extended down from the rear end of a connector link 13s in alignment with the shank 14' of the finishing cutter 27 so as to be disposed at one side of the kerf 18 as shown in Figs. 6 and 7, and along one side of the ribbon 26 which is cut from the kerf bottom by the cutting unit A. The action of the following or finishing cutter 27 tends to turn the ribbon 26 on edge in the kerf, and as the gauge tooth 23b, Fig. 1, moves forwardly it engages the end of the ribbon and moves the same forwardly, causing the ribbon to fold back and forth in the kerf 18 somewhat as shown at 26' in Figs. 6 and 7. The runner 36, as shown in Fig. 6, slopes downwardly and outwardly away from the central plane of the chain and the lower portion 37 thereof is curved in a manner similar to the curvature of the lower end of the gauge 30. The runner 36, however, has the lower end portion 37 thereof shortened slightly so that it will not rest upon the bottom of the kerf 18 unless the chain intermediate the cutting units A and B sags.

It will be observed that the runner 36 is disposed on the link 12s eccentrically of, and back (rightwardly) of a vertical line extended through the center of the rivet 10' which connects the link 12s to a contiguous link 11s, so that when the chain is moved through a curved path the runner 36 will rotate outwardly around the rivet 10' and project a greater distance from the line of the chain links, as shown in Fig. 9. Herein the chain is extended around the rounded end of a saw blade 39 and during its employment in the operation of boring into a log 40. As the blade 39 is moved in the direction of the arrow 41, the chain, as it passes around the end 38 of the blade 39 will cut a recess or bore 42 in the log 40, progressively deepening the same until the bore, consisting of a narrow slot, extends through the log. The runner 36, arranged between the cutting units A and B engages the bottom 43 of the bore 42 and therefore prevents application of excess force to the cutters of the cutting units A and B. This results in a smooth boring action and also prevents excessive destructive forces being applied to the chain. The saw chain is characterized by very fast boring action which results from the articulation of the leading and finishing cutters of the cutter units A and B so that they may act as independent cutters as they pass around the end of the blade 39, each lifting its allotted portions of the chips or ribbons which are removed from the bottom of the kerf 18.

A further feature of the invention is the spacing of the cutting units A and B, which have previously been described herein, far apart in the chain structure by the use of a plurality of connector links, thereby adapting the chain for high speed use. This chain may be employed in an engine driven saw device wherein the chain-driving sprocket is driven at the same speed as the engine crankshaft. To illustrate a form of this high speed chain, I have in Figs. 1 and 2, broken the link 12s at 12x to indicate that additional spacing links and runners may be inserted thereby increasing the spacing between the cutting units A and B to an extent which is determined with relation to the velocity at which the chain is to be driven. In this chain, possibility of bumping action of the cutting units due to their being spaced far apart is avoided by placing a number of runners 36 on the chain between the cutting units.

Where the chain is to be used for the cutting of hard woods, the depth of the cut taken by each cutting unit will be decreased. The thickness of the shaving or ribbon removed by each cutting unit will be therefore decreased and its volume will be likewise reduced. To compensate for the reduction in the volume of wood cut by each cutting unit in making a single pass through the kerf, the cutting units are placed closer together. For example, one set of connector links 11s and 12s, Fig. 1, and the runner 36, will be removed, thereby bringing the cutting unit B closer to the cutting unit A and reducing the length of the chip conveying compartment 35' therebetween.

I claim:

1. In a saw chain adapted to cut a kerf by removing from the bottom of the kerf ribbons of the material being cut, which ribbons have a width corresponding to the width of the kerf and comprising links connected by joints: a plurality of cutting units each consisting of a leading cutter on one of said links, having a corner cutting portion and a bottom cutting portion which extends from said corner cutting portion toward the center of the kerf cut by the saw chain, for lifting one side of a ribbon from the bottom of the kerf, a depth gauge on the succeeding link aligned with said leading cutter and having a portion which extends under the lifted side of said ribbon and engages the new kerf bottom formed by said leading cutter underneath said lifted side of said ribbon, and a finishing cutter on the next succeeding link and in opposite relation to said leading cutter, for lifting the remaining side of said ribbon; depth gauge means preceding said leading cutters; and connecting link means between said cutting units, said connecting link means joining said cutting units in such spaced relation that ribbon conveying sections are formed in the saw chain following said cutting units.

2. In a saw chain adapted to cut a kerf by removing from the bottom of the kerf ribbons of the material being cut, which ribbons have a width corresponding to the width of the kerf and comprising links connected by joints: a plurality of cutting units each consisting of a leading cutter on one of said links, having a corner cutting portion and a bottom cutting portion which extends from said corner cutting portion toward the center of the kerf cut by the saw chain, for lifting one side of a ribbon from the bottom of the kerf a depth gauge on the succeeding link aligned with said leading cutter, and having a toe portion which extends under the lifted side of said ribbon and rides upon the new kerf bottom formed by said leading cutter, and a finishing cutter following and contiguous to said depth gauge and being opposite hand to said leading cutter, said following cutter having a corner cutting portion and a bottom cutting portion, for lifting the remaining side of said ribbon; depth gauge means preceding said leading cutters; and connecting links between each cutting unit and the succeeding cutting unit, said connecting links joining said cutting units and forming ribbon conveying sections in the saw chain following said cutting units each of which sections is of volume to contain a ribbon cut from end to end of the bottom of the kerf.

3. In a saw chain adapted to cut a kerf by removing from the bottom of the kerf ribbons of the material being cut, which ribbons have a width corresponding to the width of the kerf and comprising links connected by joints: a plurality of cutting units each consisting of a leading cutter on one of said links, having a corner cutting portion and a bottom cutting portion which extends from said corner cutting portion toward the center of the kerf cut by the saw chain, for lifting one side of a ribbon from the bottom of the kerf, a depth gauge on the succeeding link having a portion which extends under the lifted side of said ribbon and engages the new kerf bottom formed by said leading cutter, and a finishing cutter following and in opposite relation to said leading cutter, for lifting the remaining side of said ribbon; depth gauge means preceding said leading cutters; connecting link means between said cutting units, said connecting link means joining said cutting units in such spaced relation that ribbon conveying sections are formed in the saw chain following said cutting units; and runners on said connecting links between said cutting units to hold said connecting links spaced from the bottom of the kerf, each of said runners comprising a shank portion extending adjacent one side wall of the kerf and an end portion to engage the kerf bottom.

4. In a saw chain comprising links connected by joints: a plurality of cutting units each consisting of a leading cutter on one of said links, having a corner cutting portion and a bottom cutting portion which extends from said corner cutting portion toward the center of the kerf cut by the saw chain, for lifting one side of a ribbon from the bottom of the kerf, a depth gauge on the succeeding link having a portion which extends under the lifted side of said ribbon and engages the new kerf bottom formed by said leading cutter, and a finishing cutter following and in opposite relation to said leading cutter, for lifting the remaining side of said ribbon; depth gauge means preceding said leading cutters; connecting link means between said cutting units, said connecting link means joining said cutting units in such spaced relation that ribbon conveying sections are formed in the saw chain following said cutting units; and runners on said links between said cutting units, said runners having shank portions offset from the longitudinal center line of said chain and being aligned with the shank portion of said finishing cutters.

5. In a saw chain adapted to cut a kerf by removing from the bottom of the kerf ribbons of the material being cut, which ribbons have a width corresponding to the width of the kerf and comprising links connected by joints: a plurality of cutting units each consisting of a leading cutter on one of said links and an allochiral finishing cutter on a closely following link, each of said cutters having a laterally offset shank, a corner cutting portion and a bottom cutting portion which extends from said corner cutting portion toward the center of the kerf cut by the saw chain, a depth gauge on the chain for said finishing cutter contiguous to the rear end of and aligned with the shank of said leading cutter, having a portion which extends under the lifted side of said ribbon adjacent the unsevered other side of said ribbon and engages the new kerf bottom formed by said leading cutter; depth gauge means preceding said leading cutters; and connecting links joining said cutting units in spaced relation so as to form chip conveying compartments between said cutting units.

6. In a saw chain: a plurality of cutting units, each cutting unit comprising a leading link and a following link connected thereto in closely following articulated relation, a leading cutter on said leading link having a cutting edge to lift one side of a ribbon from the bottom of a kerf, and a finishing cutter on said following link of the same height as said leading cutter having a cutting edge to lift the remaining side of said ribbon, depth gauges for said leading cutters and depth gauges for said finishing cutters of the same height as said cutters disposed contiguous to and in alignment with the rear ends of said leading cutters; and link means each comprising at least two connector links, for connecting said cutting units in spaced relation so as to provide ribbon conveying chambers following the cutter units.

7. In a saw chain: a plurality of allochiral pairs of cutting units, each cutting unit comprising a leading link and a following link connected thereto in closely following articulated relation, a leading cutter on said leading link having a bottom cutting portion and a corner cutting portion to lift one side of a ribbon from the bottom of a kerf, and a finishing cutter on said following link having a bottom cutting portion and a corner cutting portion in allochiral relation to said leading cutter adapted to lift the remaining edge of said ribbon, depth gauges for said leading cutters and depth gauges for said finishing cutters of the same height as said finishing cutters, disposed contiguous to and in alignment with the rear ends of said leading cutters; and links connecting said cutting units in series in the chain.

8. In a saw chain adapted to cut a kerf by removing from the bottom of the kerf ribbons of the material being cut, which ribbons have a width corresponding to the width of the kerf: a plurality of cutting units each comprising first, second and third links, connected together by hinge means, a leading cutter on said first link having a cutting edge to lift one side of a ribbon from the bottom of a kerf being cut, a following cutter on said third link having a cutting edge to lift the other side of said ribbon, a depth gauge for said following cutter on said second link aligned with and contiguous to the rear end of said leading cutter, said depth gauge having a part engageable with the kerf under the ribbon and depth gauge means for said leading cutter; and connecting link sections connecting said cutting units in spaced relation along the chain, each of said sections comprising a plurality of links forming a ribbon conveying chamber of volume greater than the volume of the ribbon removed from end to end of the bottom of the kerf by the cutting unit which precedes said section.

9. In a saw chain: a plurality of cutting units each comprising first, second and third links, connected together by hinge means in the order given, a leading cutter on said first link having a cutting edge to lift one side of a ribbon from the bottom of a kerf being cut, a following cutter on said third link having a cutting edge to lift the other side of said ribbon, a depth gauge for said following cutter on said second link aligned with and contiguous to the rear end of said leading cutter; said depth gauge having a shank portion laterally offset so as to lie adjacent a side wall of said kerf and a kerf-bottom engaging toe extending laterally from the extremity of said shank portion and under said side of said ribbon lifted by said leading cutter, and depth gauge means for said leading cutter; and connecting link sections connecting said cutting units in spaced relation along the chain.

10. In a saw chain adapted to travel in a predetermined cutting direction: a plurality of center links arranged end to end; side links at the respective sides of said center links, pairs of said side links operably connecting adjacent ends of the center links together, the front ends of the side links being pivotally connected to the rear ends of the preceding center link and the rear ends of said side links pivotally connecting the front end of the succeeding center link; a cutter on one of said side links having a kerf bottom and side cutting edge at one end; and a depth gauge on the opposite side link paired with said cutter carrying side link, said depth gauge being disposed adjacent the forward end of said depth gauge carrying link and located ahead of said cutting edge, said depth gauge extending outwardly with a portion disposed on one side of the longitudinal center plane of the saw chain to engage a portion of the kerf bottom on one side of said plane.

11. In a saw chain adapted to travel in a predetermined direction to cut a kerf by removing from the bottom of the kerf ribbons of the material being cut, including: a plurality of longitudinally arranged center links; pairs of side links having corresponding ends pivotally connected to the respective ends of and on opposite sides of adjacent center links; a leading cutter on one of said side links having its leading edge in the predetermined direction short of the leading end of the link on which it is disposed and an allochirally arranged following cutter on a following side link at the side of the chain opposite the side having the link on which the leading cutter is carried, said following cutter also having its leading edge short of the leading end of the link on which it is carried said leading edge on each of said cutters providing a kerf bottom and side cutting edge; and depth gauges on the opposite side link of each cutter including pair of side links, each depth gauge being disposed at the leading end of the side link on which it is mounted and located ahead of the leading edge of the cutter on the link with which it is paired, each depth gauge extending outwardly with a portion disposed on one side of the longitudinal center plane of the saw chain to engage a portion of the kerf bottom on one side of said plane.

12. In a saw chain adapted to travel in a predetermined cutting direction: a plurality of cutting units each comprising first, second and third center links longitudinally of said chain; a pair of side links pivotally connected to the rear end of the first center link and the front end of the second center link; one of said side links being at one side of said center links and the other side link being at the opposite side thereof; a second pair of similarly arranged side links pivotally connected to the rear end of the second center link and to the front end of the third center link; a leading cutter on one of the first pair of side links having a kerf bottom and side cutting edge to lift one side of a ribbon from the bottom of a kerf being cut; an allochirally arranged following cutter on a side link of the second pair of side links on the opposite side from the side link having the leading cutter, said following cutter having a kerf bottom and side cutting edge to lift the other side of said ribbon; and a depth gauge for each of said cutters, said gauges being on respective side links directly opposite the links having the cutters thereon in each of said pairs of side links, said depth gauges preceding the respective cutters in a cutting direction, each depth gauge extending outwardly with a portion disposed on one side of the longitudinal center plane of the saw chain to engage a portion of the kerf bottom on one side of said plane.

13. In a saw chain adapted to travel in a predetermined cutting direction: a series of center links; a series of side links pivotally connected to said center links on opposite sides thereof; a cutter mounted on one of said side links having a forward end in the cutting direction, said cutter having a side wall and a bottom wall which has a rearward slope from the forward end toward said one side link of said chain, said cutter having a cutting edge formed on the forward end of said side wall and said bottom wall; and a depth gauge for said cutter spaced forwardly of and adjacent said cutting edge, mounted on a side link other than a cutter carrying side link and on the opposite side of said chain from said cutter, said depth gauge extending outwardly with a portion disposed on one side of the longitudinal center plane of the saw chain to engage a portion of the kerf bottom on one side of said plane.

14. In a saw chain adapted to travel in a predetermined cutting direction: a series of center links; a series of pairs of side links pivotally connected to said center links on opposite sides thereof; a cutter mounted on one of said side links having a forward end in the cutting direction, said cutter having a side wall and a bottom wall which has a rearward slope from the forward end toward said one side link of said chain, said cutter having a cutting edge formed on said forward end of said side wall and said bottom wall; and a depth gauge for said cutter mounted on an opposite side link of the same pair of side links on which said cutter is mounted, said depth gauge extending outwardly with a portion disposed on one side of the longitudinal center plane of the saw chain to engage a portion of the kerf bottom on one side of said plane.

References Cited in the file of this patent

UNITED STATES PATENTS

| | | |
|---|---|---|
| Re. 24,129 | Hassler | Mar. 13, 1956 |
| 2,508,784 | Cox | May 23, 1950 |
| 2,565,502 | Johanson | Aug. 28, 1951 |
| 2,589,015 | Merz | Mar. 11, 1952 |
| 2,652,076 | Bye | Sept. 15, 1953 |
| 2,655,958 | Gammel | Oct. 20, 1953 |
| 2,872,956 | Gudmundsen | Feb. 10, 1959 |